United States Patent [19]
Erickson et al.

[11] 3,930,879
[45] Jan. 6, 1976

[54] CLOSED ALKALINE WASH WATER SYSTEM FOR CLEANING METAL PARTS

[75] Inventors: Paul R. Erickson, Glendale; Lawrence M. Sontoski, West Allis, both of Wis.; Albert R. Sylvester, Calumet City, Ill.

[73] Assignee: Rexnord Inc., Milwaukee, Wis.

[22] Filed: Mar. 20, 1974

[21] Appl. No.: 453,120

[52] U.S. Cl. ............... 134/10; 134/25 R; 134/108; 134/109; 210/104; 210/187; 210/540
[51] Int. Cl.² ................ B08B 3/10; B01D 17/02; B01D 21/10
[58] Field of Search ............ 134/10, 25 R, 108, 109; 210/83, 187, 195, 104, 524, 537, 540

[56] References Cited
UNITED STATES PATENTS

| | | | |
|---|---|---|---|
| 1,743,465 | 1/1930 | Maag et al. | 134/109 X |
| 2,711,978 | 6/1955 | Groom | 134/10 |
| 3,372,704 | 3/1968 | Ashworth | 134/109 |
| 3,544,369 | 12/1970 | Keogh, Jr. | 134/10 X |
| 3,639,172 | 2/1972 | Keogh, Jr. | 134/10 X |
| 3,823,823 | 7/1974 | Dokter et al. | 210/79 |
| 3,846,173 | 11/1974 | Ihrig | 134/10 |

*Primary Examiner*—Robert L. Lindsay, Jr.
*Assistant Examiner*—Richard V. Fisher
*Attorney, Agent, or Firm*—Sughrue, Rothwell, Mion, Zinn & Macpeak

[57] ABSTRACT

An alkaline wash water system for cleaning metalworking oil and scale from metal parts including a heated wash water recirculation system in which a small portion of the wash water is continuously removed, the oil and scale separated, and the cleaned portion returned with any make-up water required. The wash water is recirculated through a central zone of the separator. The separation may be a dual, alternate batch separation with a surge tank.

13 Claims, 2 Drawing Figures

CLOSED ALKALINE WASH WATER SYSTEM FOR CLEANING METAL PARTS

BACKGROUND OF THE INVENTION

1. Field of the Invention

This invention relates to a closed alkaline wash water system for cleaning metal-working oil and scale from metal parts in the process of their manufacture and then cleaning the alkaline wash water of the metal-working oil and scale removed from the metal parts and reusing the wash water.

2. Description of the Prior Art

Prior to heat treating stamped, forged or machined metal parts, it is often necessary to remove accumulated metal-working oils. This is usually done with a wash or rinse using various alkaline detergent cleaning solutions, at a temperature of 180°–200°F. at a pH range of 9 to 13. Various commercial units, such as the Blakesley, the Ransehoff and the Combustion Engineering machines use either rotary drum, belt or dipping, with and without spray headers, to clean parts, i.e., chain links or side bars, pins, barrels, transmission sections, and the like. Spent alkaline cleaner contains approximately 10,000mg/l tightly emulsified oil at a pH 12. When added to other dilute high flow streams, a difficult waste water treatment problem is created. This oil and spent detergent wash water can be collected and treated conventionally by the use of equalization holding tanks, removal of free oil and settleable solids, acidification and removal of broken emulsion oils, chemical coagulation, sedimentation and/or flotation, neutralization (as required) and sludge disposal.

However, this approach requires production floor space and above daily normal operating talents such as determining daily chemical pretreatment (this varies from batch to batch) and proper sequential processing of batch flows, addition of chemicals, removal of separated solids, and laboratory analysis of discharged effluent samples. It also requires high capital cost in initial equipment.

SUMMARY OF THE INVENTION

The present invention is incorporated in the usual in-plant alkaline wash water system which includes the usual recirculating system referred to for convenience as the first loop. The invention collects the oily waste overflow and treats the same by removing free oil and settleable solids and reuses the alkaline cleaner. This is accomplished at elevated temperatures so that a major fraction of the oil washed from the parts remains free and is readily separable without chemical treatment. The invention utilizes a gravity oil-water separator which may be a continuous or a batch flow unit with two hydraulically independent separation zones, only one of which is in operation at one time. That is, for a period of time one separator operates on a flow-through basis or as a three-part separator and the other operates on a batch basis or as a two-part separator. The two separators are then reversed as to function for the next period. In the separation zones, oil and scale are removed from the wash water and the wash water is recirculated in a second loop. Make-up water is added as required, preferably to the second loop. With the cleaning, the alkaline wash water life has been greatly extended and the problems of environmental protection have been minimized with concomitant significant savings in the cost of treatment.

DETAILED DESCRIPTION OF PREFERRED EMBODIMENTS

Figure 1:
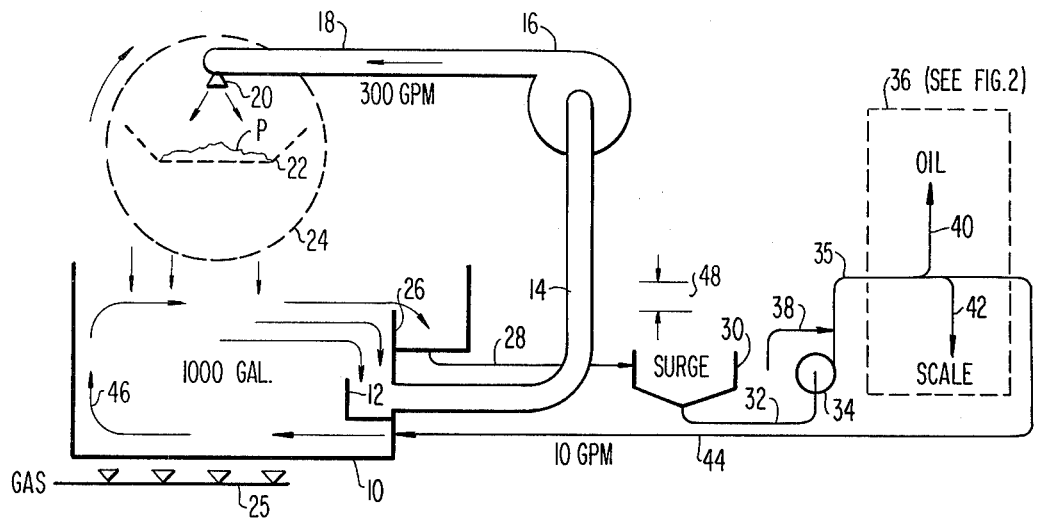
FIG. 1 is a schematic flow sheet diagram of the treatment system of this invention.

A wash water holding tank 10 includes a submerged outlet 12 for the recirculating line 14 to the pump 16 which delivers the wash water through line 18 to spray header 20 and onto parts P on shelf 22 upon their entering the rotating perforate drum 24. The wash water with the oil that has been washed off the parts flows back into the tank from drum 24 by gravity. In the typical example illustrated, the tank 10 has a 1,000 gallons capacity, the delivery rate is 300 gallons per minute, and parts P are parts up to the size of 4 inches by 4 inches. The alkaline detergent cleaning solution is that customarily used, having a pH range of 9 to 13. The tank 10 is heated by gas burner 25 so that the wash water solution is kept at about 200°F.

Tank 10 is provided with the weir 26 and a small amount of the wash water continuously overflows the weir and passes through overflow outlet pipe 28, for example at 10 gallons a minute, into a surge tank 30. From the surge tank 30, the wash water which is to be treated and recirculated passes through line 32 to pump 34 where it is pumped through line 35 into an oil wash water and scale separator, illustrated schematically at 36. Make-up water is automatically added through line 38 because up to 20% of the total wash water volume may be lost each day from evaporation and parts removal or "drag out". In the separator 36, the oil, being lighter than the wash water, flows to the top and is separated by gravity, schematically illustrated at 40; the scale, being heavier, flows to the bottom, schematically illustrated at 42; and the wash water, without the scale and oil, is returned through return line 44 to tank 10 at the rate of about 10 gallons per minute. Thus, the separator 36 separates the free oil and separable solids and the alkaline cleaner is reused. Because of the higher temperatures, a major fraction of the oil washed from the parts remains free and readily separable without chemical treatment. The separator level for gravity separation is above the overflow weir level, as indicated by the level difference 48, in FIGS. 1 and 2, so that the return flow through line 44 is by gravity or hydraulic head of this level difference. If the parts P are moving through the washer over tank 10 on a continuous basis, the pump 16 operates continuously and the level difference referred to is substantially constant. However, if the parts are washed on a batch basis, the pump 16 is operated only while parts are to be washed. That is, as pump 16 is turned off and on, the level of the wash water in tank 10 will be higher and lower at different moments. Surge tank 30 allows the pump 34 to operate continuously at the rate which is required for the recirculation through separator 36.

Figure 2:
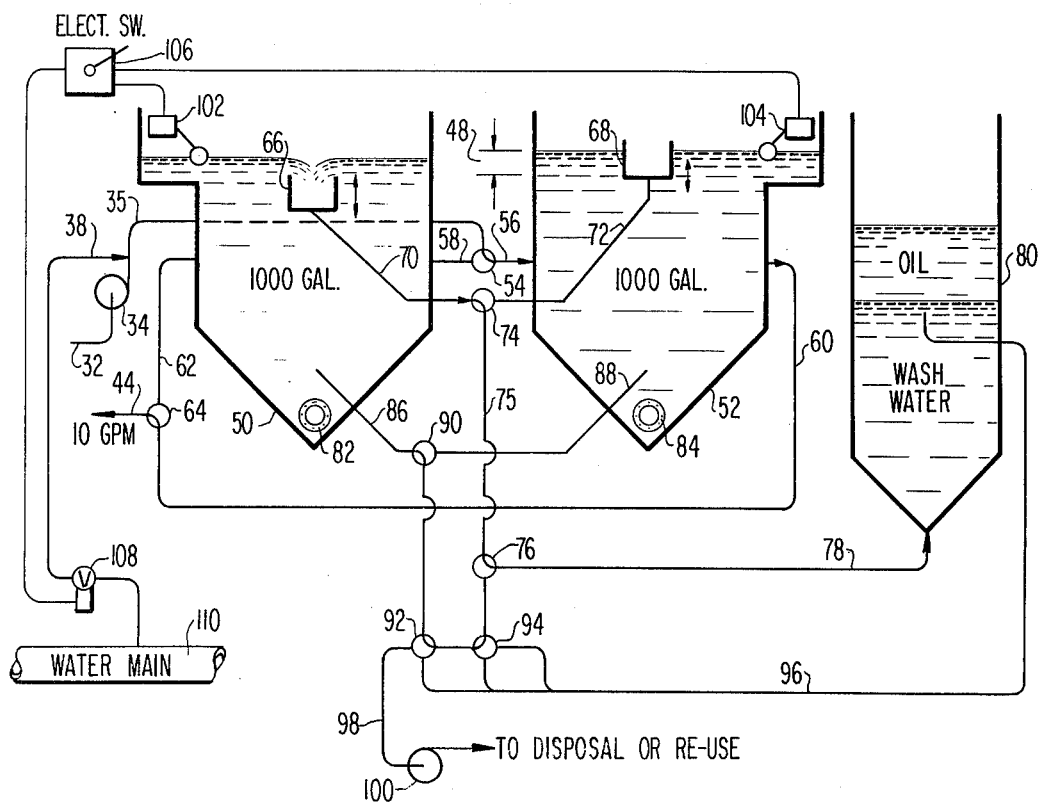
FIG. 2 is a schematic flow sheet diagram of the gravity oil-water separator system utilized by this invention shown schematically in FIG. 1.

FIG. 2 illustrates the separator unit of FIG. 1. It includes two tanks which are used alternately, tanks 50 and 52, which for example, may have a 1,000 gallon capacity. The output from pump 34 is pumped at 10 gallons per minute through the control of valve 54 to the central zone of either of the tanks, through lines 56 or 58. In the tanks, gravity separation takes place, the scale tending to settle and the oil tending to rise, so that the wash water with the scale and oil separated can be reused. Recirculation lines 60 and 62 provide for the withdrawal of wash water from tanks 50 and 52. For that purpose, line 60 is connected to tank 52 oppositely of line 56; line 62 is connected to tank 50 oppositely of line 58. Lines 60 and 62 are selectively connected to a recirculation control valve 64, which feeds recirculation line 44, so that the same tank that is being fed has the separated wash water recirculated at the rate of about 10 gallons per minute. The central zone of the tank is then a flow-through zone.

Suitable oil skimmers, shown schematically in FIG. 2 as vertically movable skimming troughs 66 and 68, the trough 66 being located in tank 50 and the trough 68 being located in tank 52. The two troughs are connected by conduits 70 and 72 to a control valve 74, then through lines 75 and 78, under the control of valve 76, to a tank 80. As shown, tank 52 is now being used for separation in FIG. 2, while the oil is being skimmed off the top of tank 50 and passed to tank 80 under the control of valves 74 and 76. The separated wash water in tank 80 may also be suitable for reuse in some cases.

The tanks have access holes 82 and 84 for periodically removing the scale from the bottom of the tanks. Wash water lines 86 and 88 are above the bottom of the tanks, but below the removal level, and are controlled by valves 90, 92 and 94, so that the wash water may be held in the tank in the condition of the valve shown, switched to tank 80 via line 96 or through line 98 to pump 100 and disposal. Also, the oil which is separated from the wash water in tank 80 may be removed and reused.

Make-up water in the tank is controlled by level switches 102 and 104 connected to an electrical switch 106, which controls valve 108 connected in the line 38 between water main 110 and line 35. In the condition shown, the level in tank 50 is dropping due to the skimming of the oil, and level detector signals will accordingly cause additional make-up water to be added to tank 50. Since only water is added to make-up line 38 and the pH must be maintained, for example to an average of pH 12, caustic cleaner is added manually at each shift to compensate for cleaner lost to "drag out."

In one, non-limiting example of the system now in operation, the capacities and flows illustrated in the drawings are utilized, and each tank 50 and 52 provides a 30 minute detention time. After about 24 hours of operation with one of the tanks, the free oil accumulation is skimmed, as shown for tank 50. With the flow rate shown, it takes 60 minutes for a complete circulation of the flow through the process. When the oil is skimmed, there is a switch-over to the other tank, for example tank 52 in FIG. 2, and the settling in tank 50 will also result in the residual fines or scales settling to the bottom prior to reuse of the alkaline water. The make-up skimming operation requires about 30 minutes. Instead of using a trough skimmer, other known skimmers such as roll skimmers could be used.

The disclosed system has eliminated oil carry-over into the heat treating process, so that all parts are cleaned, and has reduced particulate hydrocarbon emissions to well within environmental regulations. Moreover, a cleaned wash water solution is available at all times to the spray header 20 and this clean water has increased the capacity of the washer from less than 1,000 lbs. per hour to 4,500 lbs. per hour, the only change being the cleaning and recirculating of the oil by the oil separator to achieve this higher production rate. The alkaline wash water life has been extended from 1 week with a 5 to 10 gallon per minute continuous overflow and continuous wasting to 4 weeks with 0 discharge, i.e., a closed system. After the 4 week period, the total closed system volume of 1,200 gallons is hauled away for incineration. Additionally, the alkaline cleaner solution consumption has been reduced from 2,500 lbs. to 1,200 lbs., resulting in significant monthly savings. Of course the reduction in the amount of wasted water reduces the hauling of the spent waste and oily waste from 5,000 to 7,000 gallons per day to less than 200 gallons per day, which also results in a significant dollar savings in reduced haulage costs.

In particular, the invention may be incorporated in various types of parts washing apparatus which include the first loop and may utilize various types of gravity separation systems for removal of the oil and scale in the second loop.

In some systems, the parts move continuously through the washer during the entire work day. In that case, the circulation of the wash water over the parts by pump 16 is similarly continuous. Accordingly, circulation of the wash water by pump 34 through the separator could be continuous on a 24-hours per day basis, whereas the oil and scale might be removed from the separators on week-ends or even less frequently. In other systems, the parts are placed in the washer for certain periods which may be regulated according to the washing or rinsing requirements. Generally, the circulation of the wash water by pump 16 is effected only as required during those periods, whereas the recirculation of the wash water by pump 34 might be on an 8-hour day or as required. In any such system also, a single separator might be required, and the separator might include means for the continuous or periodic removal of the floating oil, and possibly the settled scale as well, while the single separator is in service.

It should also be noted that while parts P are not being washed and pump 16 is not operating, the tank 10 normally or unavoidably functions as a settling and flotation tank which requires periodic attention.

An important feature of the invention thus resides in the continuous circulation of the second loop as is provided for by line 44. As shown, line 44 opens into tank 10 so that the circulation of the second loop, which is continuous, sweeps the bottom of tank 10 and across the upper level of the wash water in the tank to direct scale and oil toward the weir 26. Tank 10 is thus kept "clean" of scale for an indefinite period and only requires cleaning on rare occasions, which might be while the plant is shut down for other maintenance purposes.

We claim:

1. In an alkaline wash water system for cleaning metal-working oil and scale from metal parts in the process of their manufacture, said system including a container for temporarily holding such parts, a pump, a wash water supply line from said pump to said container for discharging the wash water over such parts, a wash water supply tank disposed to receive the wash water with oil and scale which drains from such parts and having an outlet connected to said pump and a heater for continuously maintaining the wash water in the tank at an elevated temperature, said pump providing the circulation of the wash water over the parts in a first loop as required, the improvement wherein said tank is provided with an overflow weir for the continuous withdrawal of the upper fraction of the wash water therein, and an inlet for the continuous return of wash water to the tank, a gravity separator including means defining a central zone having an inlet and an outlet for connection to said tank, said separator further having an upper outlet for removal of floating separated oil and a lower outlet for removal of settled separated scale, and hydraulic lines including a pump respectively connecting the central zone inlet and outlet with the tank outlet and inlet respectively and providing the continuous recirculation of wash water through the central zone of said separator in a second loop, said heater and said hydraulic means being effective to maintain the contents of the separator also at an elevated temperature.

2. The improvement of claim 1 wherein the inlet provided the wash water supply tank is directed so that the flow of the second loop into said tank is effective to direct scale and the floating oil therein toward the overflow weir provided for the removal of the upper fraction of the wash water in the tank, particularly while no parts are being washed and no circulation of the wash water in the first loop is being effected.

3. The system of claim 1 which includes a second separator and hydraulic lines and valves for the alternate use of one separator while the oil and scale is removed from the other separator —that is, one separator functions as a three-part separator while the other functions as a two-part separator, and the functions of the two separators are periodically alternated.

4. The system of claim 3 which includes a third gravity separator and lines connecting the same alternately to either of said first two separators to receive therefrom and to allow the separated components of such oil to be selectively reused and disposed of.

5. The system of claim 1 wherein a make-up water supply line having a valve controlling the line is connected to the separator and the separator includes a float controller which operates said valve to open the line when the level in the separator is less than a selected elevation.

6. The system of claim 5 wherein the elevation referred to is a selected distance above the overflow weir of the tank, whereby the minimum rate of flow referred to is determined and maintained by the hydraulic head represented by said distance.

7. An alkaline wash water system for cleaning metal-working oil and scale from metal parts in the process of their manufacture, said system including a spray header, a temporary parts container beneath said header, a tank below said container and having a heater and an outlet along one side of the tank, and a recirculating pump having its inlet connected to said tank outlet and its discharge outlet connected to said spray header, said pump providing the recirculation of wash water in the tank in a first loop, said tank further having an inlet below said outlet, an overflow weir above said outlet and an overflow trough and the system further including a second pump and gravity separator hydraulically connected in series with said tank inlet and overflow trough, said separator more specifically having an intermediate inlet connected to said trough, an upper outlet for the oil removed from the parts and floating in the separator, a lower outlet for the scale from the parts and settled in the separator, and an intermediate outlet connected to the inlet of said tank, said second pump providing the continuous recirculation of the wash water product of the separator in a second loop, the recirculated washing water passing through a central zone of the separator defined between said intermediate inlet and said intermediate outlet, said heater being effective to maintain both loops at a suitably elevated temperature, the movement of the combined loops in the tank being in the direction of the overflow weir of the tank, and said second pump maintaining the rate of flow of the second loop at the minimum rate of flow over the weir whereby the scale as well as the oil from the parts is transferred from the first loop to the second loop for their removal in the separator.

8. A system as in claim 7 further comprising means for adding wash water to the system to accommodate for wash water lost by evaporation and parts drag out.

9. A system as in claim 7 wherein the separator comprises a pair of gravity separation tanks connected to be alternately usable and wherein said upper outlet is an oil skimmer.

10. The method of cleaning metal-working oil and scale from metal parts in the process of their manufacture with a given supply of an alkaline wash water, which method comprises withdrawing wash water from said supply, circulating the withdrawn wash water over said parts and returning the wash water with oil and scale to the supply, separately withdrawing and continuously circulating a small portion of said supply through the central zone of a gravity separator, providing the wash water in the separator with a detention time which allows the oil and scale to separate therefrom, separately removing the oil and scale from the top and bottom of the separator, respectively, drawing separated wash water off from the central zone of the separator, and returning the separated wash water to said supply.

11. The method of claim 10 which includes adding make-up water to the portion circulating through the separator.

12. The method of claim 10 which includes directing the return of the wash water from the separator into the wash water supply to cause the settled scale and floating oil in the supply to be withdrawn therefrom and introduced into the separator with said small portion referred to.

13. The method of claim 10 which includes continuously heating the supply of wash water directly and indirectly heating the wash water in the separator.

* * * * *